US008956204B2

(12) United States Patent
Niedecker

(10) Patent No.: US 8,956,204 B2
(45) Date of Patent: Feb. 17, 2015

(54) CASING BRAKE ASSEMBLY WITH ROTATABLE MEMBER

(71) Applicant: Poly-clip System GmbH & Co. KG, Hattersheim (DE)

(72) Inventor: Frank Niedecker, Porza (CH)

(73) Assignee: Poly-Clip System GmbH & Co. KG, Hattersheim (DE)

( * ) Notice: Subject to any disclaimer, the term of this patent is extended or adjusted under 35 U.S.C. 154(b) by 0 days.

(21) Appl. No.: 14/222,945

(22) Filed: Mar. 24, 2014

(65) Prior Publication Data

US 2014/0287665 A1        Sep. 25, 2014

(30) Foreign Application Priority Data

Mar. 22, 2013    (EP) .................................... 13160636

(51) Int. Cl.
*A22C 11/00*        (2006.01)
*A22C 11/02*        (2006.01)

(52) U.S. Cl.
CPC ................................. *A22C 11/0263* (2013.01)
USPC ........................................................ 452/32

(58) Field of Classification Search
CPC .... A22C 15/002; A22C 15/001; A22C 11/00; A22C 11/125; A22C 11/008; B65G 2201/0202; B65G 2201/0229; B65G 33/02; B65G 33/32; B65G 33/34; B65G 47/261; B65G 47/61
USPC ....................................................... 452/21–51
See application file for complete search history.

(56) References Cited

U.S. PATENT DOCUMENTS

| 4,719,667 | A |   | 1/1988 | Urbutis |
|---|---|---|---|---|
| 5,830,051 | A | * | 11/1998 | Kasai et al. ...................... 452/48 |
| 5,918,447 | A | * | 7/1999 | Hanten et al. ................... 53/551 |
| 6,645,062 | B1 | * | 11/2003 | Buckles .......................... 452/35 |
| 6,705,063 | B1 | * | 3/2004 | Topfer et al. ..................... 53/577 |
| 6,875,100 | B2 | * | 4/2005 | Topfer ............................ 452/40 |
| 7,555,877 | B2 | * | 7/2009 | Redaelli .......................... 53/234 |
| 7,704,130 | B2 |   | 4/2010 | Hanten et al. |
| 8,715,043 | B2 | * | 5/2014 | Sames ............................. 452/35 |
| 2007/0072528 | A1 |   | 3/2007 | Topfer |
| 2012/0175015 | A1 |   | 7/2012 | Jens |

FOREIGN PATENT DOCUMENTS

| EP | 1428437 A1 | 6/2004 |
|---|---|---|
| EP | 1987719 A1 | 11/2008 |

* cited by examiner

*Primary Examiner* — Richard Price, Jr.
(74) *Attorney, Agent, or Firm* — Hahn Loeser & Parks LLP

(57) ABSTRACT

A casing brake assembly for applying a frictional force to a tubular or bag-shaped packaging casing arranged on a filling tube of an apparatus used for filling and closing said tubular or bag-shaped packaging casing and for limiting the movement of said tubular or bag-shaped packaging casing at least while being filled, wherein the filling tube has a circular cross-section, the casing brake assembly comprising a housing and at least a first brake body and at least a second brake body, wherein at least the second brake body is reversibly movable relative to the first brake body between a releasing position and a braking position about said common central axis wherein, in releasing position, the brake bodies are forming a ring, which has an open segment, wherein the filling tube is pivotable through the open segment, and wherein, in braking position, the brake bodies are forming a substantially closed ring.

17 Claims, 14 Drawing Sheets

CASING BRAKE ASSEMBLY WITH ROTATABLE MEMBER

CROSS-REFERENCE TO RELATED APPLICATION

This application claims priority to, and the benefit of, European Patent Application 13 160 636.0-1655 filed Mar. 22, 2013 with the European Patent Office, which is hereby incorporated by reference.

BACKGROUND OF THE INVENTION

The present invention relates to a casing brake assembly for applying a frictional force to a tubular or bag-shaped packaging casing being temporarily arranged on a filling tube of an apparatus for filling and closing the tubular or bag-shaped packaging casing, like a clipping machine. The casing brake assembly is provided for limiting the movement of the packaging casing at least while being filled during a filling process. The filling tube has a circular cross-section and a longitudinal filling tube axis.

In practice, it is known that, for example in the production of sausage-shaped products, like sausages, flowable filling material is fed by a filling machine through a filling tube of a clipping machine in a feeding direction into a tubular or bag-shaped packaging casing, which is stored on the filling tube and which is closed at its front end, i.e. the end pointing in the feeding direction of the filling material, by a closure means, like a closure clip. The tubular packaging casing is pulled-off the filling tube while being filled due to a pulling force caused by the feeding pressure of the filling material discharged from the filling tube. At least during the filling process, a casing brake applies a frictional force to the tubular packaging casing that is being pulled-off from the filling tube, in order to control the pull-off speed and to ensure an at least approximately constant filling degree. After a predetermined volume of filling material has been filled into said tubular packaging casing, a plait-like portion of the tubular packaging casing is formed by a displacer arrangement. Known displacer arrangements generally comprise a first and a second displacer unit which can each be formed by a pair of reversibly moveable displacer elements. The clipping machine then places and closes at least one closure clip at the plait-like portion by respective closing tools, thus forming the rear end of the sausage shaped product, i.e. the end pointing against the feeding direction and the front end of the successive sausage-shaped product to be produced, respectively. The closing tools are reversibly movable towards the plait-like portion.

In EP patent application 1 428 437, a clipping machine with a fixedly arranged filling tube and a casing brake assembly is disclosed. The casing brake assembly is attached to a frame element of the clipping machine. The casing brake itself is a closed circular construction and has a closed circular lip, which surrounds the filling tube completely. A fork-shaped holding element including two rake struts, accommodates and supports the casing brake, especially in its operation position on the filling tube. For removing the casing brake from the clipping machine, the casing brake assembly has to be moved along the filling tube in the feeding direction until the casing brake is completely shifted off the filling tube. Thereafter, the casing brake may be removed from the fork-shaped holder in a direction perpendicular to the longitudinal axis of the filling tube.

A further known casing brake assembly for a fixedly arranged filling tube is disclosed in EP patent application 1 987 719. The casing brake assembly includes two brake rings. An inner brake ring is fixedly and coaxially to the filling tube axis mounted on the filling tube and comprises a brake surface arranged at its outer circumference. An outer brake ring is provided for coaxially surrounding the inner brake ring on the filling tube. The outer brake ring comprises a circular lip, which is engaged with the packaging casing material that is on the brake surface of the inner brake ring for applying a frictional force to the tubular packaging casing material guided between the two brake rings. For adjusting the brake force applied to the packaging casing, the outer brake ring can be shifted along the filling tube relatively to the inner brake ring. For removing at least the outer brake ring from the filling tube, e.g. in order to refill tubular packaging casing material onto the filling tube, the outer brake ring has to be shifted in the feeding direction along the filling tube axis until it is moved off the filling tube.

For all of these known assemblies, additional space has to be provided in the region of the discharge end of the filling tube, i.e. the end of the filling tube that is facing in feeding direction, in order to provide the required space for the casing brake assembly or parts thereof, respectively, when being moved off the filling tube. In order to provide the required space, the displacer arrangement and/or the clipping machine which are positioned downstream the filling tube, have to be configured for being reversibly moved in the feeding direction. This technical requirement demands an additional effort in their construction and additional space at the installation site.

Thus, it is an object of the present invention to provide a casing brake assembly, which overcomes the above mentioned drawbacks, and which allows a simplified and compact construction of a clipping machine.

SUMMARY OF THE INVENTION

The object indicated above is solved by a casing brake assembly for applying a frictional force to a tubular or bag-shaped packaging casing being arranged on a filling tube of an apparatus for filling and closing the tubular bag-shaped packaging casing, like a clipping machine. The casing brake assembly is provided for limiting the movement of the packaging casing at least while being filled in a filling process. The filling tube has a circular cross-section and a longitudinal filling tube axis. The casing brake assembly comprises a housing and at least a first brake body and at least a second brake body. The first brake body has a first inner clearance, which is shaped like a segment of a circle, with a first central axis, and the second brake body has a second inner clearance, which is shaped like a segment of a circle, with a second central axis. The first inner clearance and the second inner clearance are arranged coaxially on a common central axis extending through said housing. At least the second brake body is reversibly moveable relative to the first brake body between a releasing position and a braking position along an at least substantially circular-shaped moving path about said common central axis. In the releasing position, the first and second brake bodies substantially overlap each other, thereby forming a ring which has an open segment. The open segment of the ring is shaped such that the filling tube is movable, i.e. pivotable, through the open segment of the ring. Thus, in releasing position, the filling tube can be pivoted out of and into the casing brake assembly. In the braking position, the brake bodies form a substantially closed ring. In other words, in the braking position, the first brake body and second brake body constitute a basically circular inner free space. In the braking position, the filling tube cannot be pivoted out of or into the casing brake assembly. Hence, the brake bodies completely surrounds the filling tube for applying a frictional force to the packaging casing while the packaging casing is being pulled-off the filling tube, in order to control the pull-off speed of the packaging casing and to ensure an at least approximately constant filling degree.

With the inventive casing brake assembly, it is therefore possible to carry out a replenishment of the packaging casing onto the filling tube without the need of additional space for a movement of the displacer arrangement and/or the clipping machine. Additionally, a possibility for an axial movement of the casing brake assembly is also not necessary which allows a simplified arrangement of the casing brake assembly at the clipping machine.

It has to be understood that the at least first and second brake bodies not only apply a frictional force to the tubular casing material in order to limit the movement of the packaging casing at least while being filled. The brake bodies may also have a sealing function, which means that they prevent a back flow of filling material through the space between the filling tube and the casing material by pressing the inner surface of the casing material against the outer surface of the filling tube.

Preferably, the first inner clearance and second inner clearance are at least semicircular-shaped. This configuration is e.g. applicable when only two brake bodies are provided, because the two brake bodies must be large enough for forming a closed ring. It is preferred that at least the first inner clearance and/or the second inner clearance is slightly larger than a semicircle for providing overlapping regions of the first brake body and the second brake body in braking position. In a most preferred embodiment of the invention, the first brake body has a shape of a section of a circle of a maximum degree for providing a gap that is just large enough for a filling tube with loaded packaging casing to be pivoted into the first brake body through the gap without damaging the packaging casing and/or the brake body. This shape for the first brake body is also preferred when more than two brake bodies are provided.

In an advantageous configuration, the at least first brake body and the at least second brake body are reversibly movable relative to each other between a releasing position and a braking position along an at least substantially circular-shaped moving path about said common central axis.

In a first configuration, the first brake body can fixedly be arranged and the second brake body can be moved along said at least substantially circular-shaped moving bath about said common central axis. In another configuration, both, the first and the second brake body can be movable along said at least substantially circular-shaped moving path about said common central axis. The first and the second brake body may be movable in the same direction, wherein, for forming a closed ring, when in the brake position, one of the brake bodies has to be moved farther than the other, for at least partially passing the respective other brake body. In a third configuration, the first and the second brake bodies are movable in opposite directions about the common axis, which means that, for example, the first brake body is moved clockwise from the release position into the brake position, and the second brake body, accordingly, has to be moved counter clockwise from the release position into the brake position.

In a preferred embodiment, a third brake body with a third inner clearance shaped like a segment of a circle with a third central axis can be provided. The third central axis can basically be arranged coaxially with said common central axis. The third brake body can reversibly be moveable relative to the first brake body between a releasing position and a braking position along the at least substantially circular-shaped moving path about said common central axis. The advantage of a third brake body is that, due to more parts being moveable relative to the first brake body, the distance in circumferential direction to be covered by each of the moveable brake bodies when being moved from the braking position to the releasing position or vice versa, is less than the distance in circumferential direction a single brake body has to move for fulfilling the same task.

In case the first brake body and the second brake body each comprises a substantially semicircular-shaped inner clearance of at least 180°, for attaining the releasing position from the braking position, the second brake body has to be rotated about 180° around the common central axis. For any configuration, the sum of all provided substantially semicircular-shaped inner clearances by the plurality of brake bodies should be more than 360° so that, when the brake bodies are in the braking position, adjacent brake bodies overlap in at least one area. The total substantially semicircular-shaped inner clearance should be small enough that the filling tube can be pivoted out of the casing brake assembly without damaging a brake body or the whole casing brake assembly.

For the case that three brake bodies are provided, the ratio of the size of the brake bodies can vary. In a preferred embodiment, the first brake body comprises a semicircular-shaped inner clearance of slightly above 180°, and the second brake body as well as the third brake body each comprise a quadrant-shaped inner clearance of about 90°. In this configuration, for attaining a releasing position from the braking position and vice versa, the second brake body and the third brake body each have to be moved about 90° around the common central axis.

Alternatively, it is preferred that the first brake body, the second brake body and the third brake body each comprise an inner clearance that is at least approximately shaped like a segment of a circle, which has the size of approximately one third of a circle. For attaining the releasing position from the braking position and vice versa, in this configuration, the second brake body and the third brake body each have to be moved around the common central axis by about 120°.

It is preferred that a drive unit is provided for reversibly driving at least the first and/or second brake body on the circular moving path about the central axis between the releasing position and the braking position. In the case that three brake bodies are provided, two of them are driven by said drive unit. The advantages of a drive unit are that the brake bodies can be moved into the desired position more easily. Furthermore, the drive unit can be configured for holding the respective brake body in the desired position due to friction provided by the drive unit or additional fixation means.

Preferably, the drive unit includes a cog belt or cogged wheels, which engage with respectively cogged portions of the at least one of the first, second or third brake body, which can be pneumatically actuated. Advantageously, a control unit is provided for controlling the drive unit. Preferably, the control unit is configurable for piloting the releasing position and the braking position of the brake bodies exactly.

In case that two brake bodies are provided, it is further preferred that the at least first brake body has a first cogged portion and the at least second brake body has a second cogged portion, and that the drive unit includes a first cog wheel and a second cogged wheel for reversibly driving the first brake body and the second brake body between a releasing position and a braking position along an at least substantially circular-shaped moving path about said common central axis in opposite direction.

The second cogged wheel may be directly driven by the first cogged wheel, which enables a movement of the first and the second brake bodies in opposite directions about the common axis, with the need of only one drive for both, the first and the second brake bodies. Additionally, by using cogged wheels, no slippage occurs, and the movement of the brake bodies may accurately controlled.

In an alternative embodiment, the drive unit comprises a handle for manually driving of the movable brake bodies of the inventive casing brake by an operator. The handle can comprise any means that are suitable for providing better grip for the operator, e.g. a rod with a circular cross-section, a texture, dent or cam on the outer surface of the second brake body that is facing away from the common central axis. For holding the brake body in the desired position—usually the releasing position and/or the braking position—a fixation knob, pin or screw can be provided additionally.

Preferably, at least the second brake body comprises a substantially semicircular cog wheel-shaped outer portion for being engaged with respective cogs of the drive unit. The cogs of the drive unit can be arranged e.g. on a wheel, an endless belt or a rod. By these means, slippage between the brake body and drive unit can be avoided. Moreover, this construction is particularly space saving and subject to little wearing only. Depending on the dimensions, the wheel, belt or rod can be provided with cogs partially, only.

In a further advantageous embodiment of the casing brake assembly, an adjusting crew is provided for moving the brake body relative to the brake body to adjust the frictional force applied by the brake bodies to the casing material on the filing tube.

By means of said adjustment screw, at least the position of one of the brake bodies may be altered relative to the respective other brake body. This allows a correction of the position of the casing brake assembly relative to the filling tube, and also, an adjustment of the frictional force applied by the brake bodies to the casing material on the filling tube.

It is preferred that the first brake body is not moveable or unmovable along the substantially circular-shaped moving path about said common central axis. For example, the first brake body can be fixed relatively to the housing of the casing brake assembly.

Preferably, at least the first brake body comprises guiding means for guiding the second brake body and/or the third brake body along the substantially circular-shaped moving path about said common-central axis. The guiding means can for example comprise a rim for receiving an outer circumferential portion of the second brake body and/or third brake body, thus providing guidance in axial and radial directions. Alternatively or additionally, a brake body adapter with a substantially semicircular-shaped inner clearance and guiding means for guiding the second brake body and/or the third brake body along the substantially circular-shaped moving path about said common central axis can be provided for being fixedly and removably mounted to the inner clearance of the housing. Depending on the desired function, the brake bodies are fixedly or relatively moveable mountable to the inner clearance of the brake body adapter.

It is preferred that first brake body and second brake body comprise braking and sealing elements, which are facing towards the common central axis. The braking and sealing elements should have a smooth surface to avoid damages to the packaging casing due to engagement during the filling process. However, the surface should be suitable for providing enough friction to the outer surface of the packaging casing. Furthermore, the braking and sealing elements should be flexible or attached to flexible elements for providing a substantially constant pressure thus a substantially constant friction against the outer surface of the packaging casing.

It is further preferred that, in the braking position, the braking and sealing elements partially overlap each other with respect to the direction of the circular-shaped moving path. This configuration avoids unwanted gaps between the braking and sealing elements of the brake bodies. Such gaps should be avoided because portions of the packaging casing could be trapped in such gaps during the filling process. This could cause an increase of the braking force and hence, lead to faulty products of unwanted dimensions or even severe damages to the packaging casing. Besides that products with damaged packaging casing have to be disposed, in some cases, damaged packaging casing can cause the packaging casing to burst during the filling process. This malfunction must be avoided because it can damage the clipping machine and may lead to long machine down-time as well as increased costs for repairing and cleaning. Alternatively to overlapping, at the respective areas, a determined and particularly shaped gap could be provided for avoiding the problems discussed above.

In an advantageous embodiment, the casing brake and sealing elements abut against each other with a predefined force. That means, the casing brake and sealing elements, when overlap each other, apply a force to one another in the contact region.

This configuration surely prevents a radial gap between the casing brake and sealing elements, in which casing material may be jammed, or which would lead to leaking of filling material into the space between the filling tube and the casing material.

In order to realize a respective force between the casing brake and sealing elements, said casing brake and sealing elements may have a respectively shaped outer contour, which e.g. may be curved or convex, in order to allow at least the edges of the casing brake and sealing elements directed towards the common central axis to abut against each other, when positioned in the housing of the casing brake assembly. Thereby, the force between the casing brake and sealing elements results from the residual stress in the material casing brake and sealing elements.

In a first configuration, the braking and sealing elements are formed by string-shaped resilient brake lips. Preferably, the braking and sealing elements have a substantially triangular cross-section, wherein preferably a corner is pointing towards the common central axis and a longitudinal side is pointing in the opposite direction towards the respective brake body. The material of the brake lips should be selected considering that too hard brake lips can damage the packaging casing and too soft brake lips may not provide enough braking power to the packaging casing.

In a second embodiment of the invention, the braking and sealing elements are formed by a plurality of string-shaped resilient elements. It is preferred that these resilient elements partially overlap each other due to the reasons discussed before. Alternatively, the resilient elements could be provided with determined gaps between each other that do not cause these problems.

In a third embodiment of the invention, the braking and sealing elements are of an at least partially approximately tubular inflatable construction. The advantage of this embodiment is that the braking force can be controlled by controlling the pressure inside the sealing elements, wherein an increased pressure causes a higher braking force onto the packaging casing and a reduced pressure inside the sealing elements causes a reduced braking force onto the packaging casing, respectively. Moreover, by these means, the brake body can be adjusted to different filling tube diameters.

Further preferred, at least the first brake body and the second brake body are mutually arranged in a way that the first brake body protrudes the second brake body at least in one direction with respect to the common central axis. More preferably, the first brake body protrudes the second brake body in both directions with respect to the common central axis. In case a brake body adapter is provided, the brake body adapter preferably protrudes all brake bodies in both directions with respect to the common Further advantages and preferred embodiments of the present invention will be described in the following together with the drawings listed below. The expressions "left", "right", "below" and "above" used in the following description, are referred to the drawings in an alignment such that the reference numbers and the notation of the Figs. used can be read in normal orientation.

DETAILED DESCRIPTION OF THE INVENTION

Figure 1:
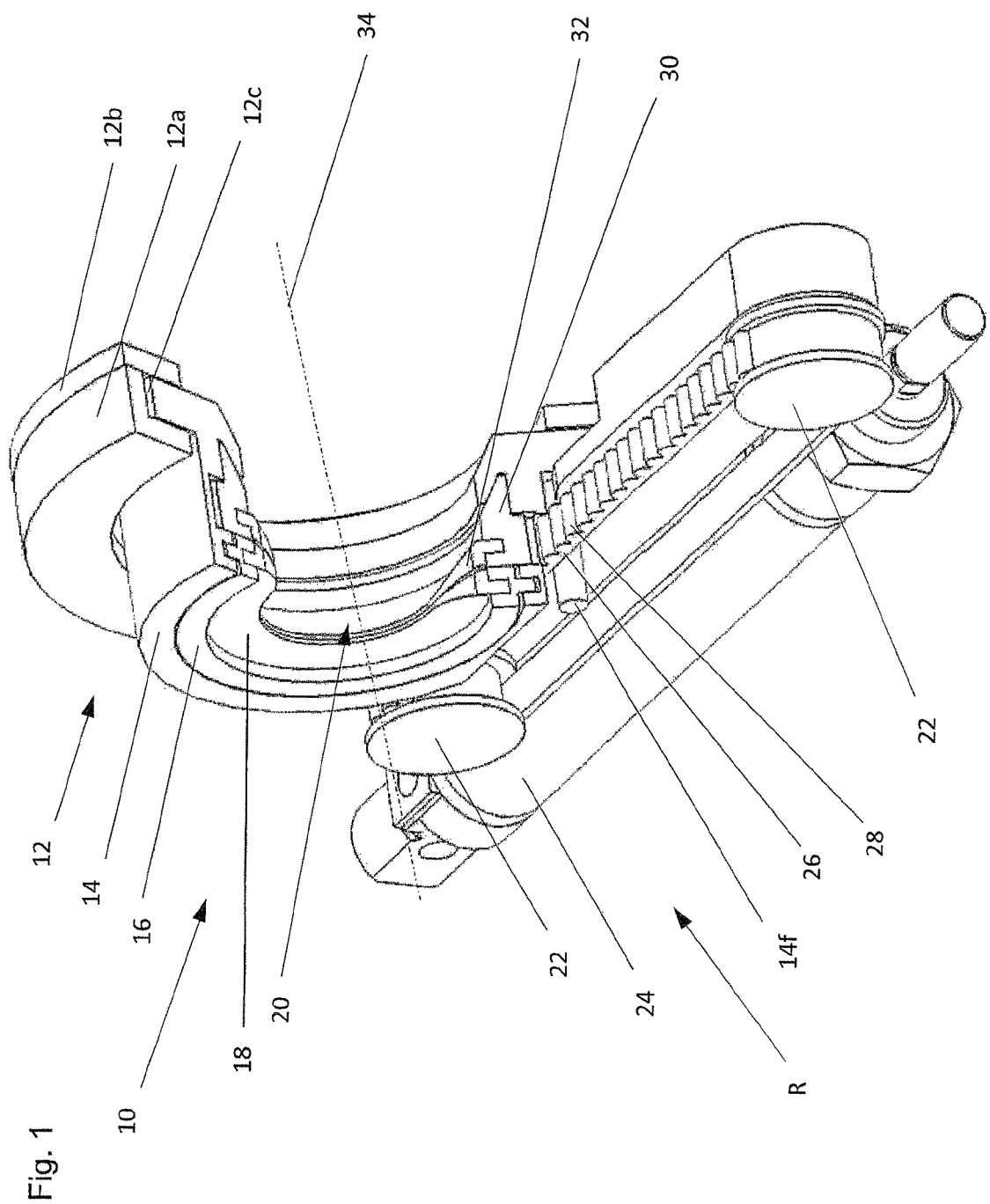
FIG. 1: is a schematic and perspective view of a first embodiment of the inventive casing brake assembly according to the present invention from a first perspective, wherein a second brake body is illustrated in the releasing position.

A first embodiment of the casing brake assembly 10 is illustrated from the first perspective in FIG. 1. The casing brake assembly 10 comprises a casing brake holder 12 with a main holder body 12*a* and a side plate 12*b*. Main holder body 12*a* and side plate 12*b* form an approximately semi-circular-shaped housing rim 12*c* in which a housing 14 is floating bedded and reversibly mounted. Housing 14, according to the embodiment of FIG. 1, has the basic shape of an approximately 200°-segment of a hollow cylinder, encompassing a first brake body 16 and a second brake body 30. First brake body 16 has the shape of a 200°-segment of a hollow cylinder and is arranged near a longitudinal first open end of housing 14. First brake body 16 has an inner and an outer diameter, wherein the outer diameter of first brake body 16 matches an inner diameter of housing 14. Second brake body 30 basically has the shape of a 200°-segment of a hollow cylinder. The inner and outer diameters of second brake body 30 are the same as the inner and outer diameters of first brake body 16. Second brake body 30 is arranged immediately adjacent to first brake body 16, for being in close contact with each other. Second brake body 30 is illustrated in releasing position R.

First brake body 16, second brake body 30 and housing 14 are arranged coaxially with a common central axis 34. First brake body 16 comprises a first brake lip 18 with the shape of an approximately 200°-segment of a ring, having a substantially triangular cross-section wherein a tip of the triangle is pointing towards the common central axis 34 and a base of the triangle is facing towards the inner surface of first brake body 16, namely the surface that is facing towards common central axis 34. Second brake body 30 comprises a second brake lip 32, which basically has the same shape as first brake lip 18. First brake lip 18 and second brake lip 32 are in close contact with their respective surfaces that are basically perpendicular to common central axis 34. The open ends of first brake lip 18 have a curved chamfer. The chamfer is curved in direction of the adjacent inner surface of first brake body 16. Second brake lip 32 comprises similar chamfers, respectively.

As it can be inferred from FIG. 1, second brake lip 32 declines towards first brake lip 18 and its surface facing towards first brake lip 18 is partially in closed contact with the respective surface of first brake lip 18 facing towards second brake lip 38. Second brake lip 38 thereby applies a force which results from its specific shape, to first brake lip 18 in order to maintain the closed contact thereto.

In the illustrated first embodiment of the invention, first brake body 16 is reversibly fixed to housing 14 wherein second brake body 30 is guided by housing 14 for being rotatable around common central axis 34. For actuating the rotational movement of second brake body 30, a cog belt 26 with a plurality of cogs 28 is provided, wherein second brake body 30 comprises matching cogs on the outer surface, namely the surface that is facing away from common central axis 34. Cog belt 26 is an endless belt, which is guided by two deflection pulleys 22 and driven by a piston-cylinder 24, to which it is connected by a respective lever 24a, schematically shown in FIG. 3.

Figure 2:
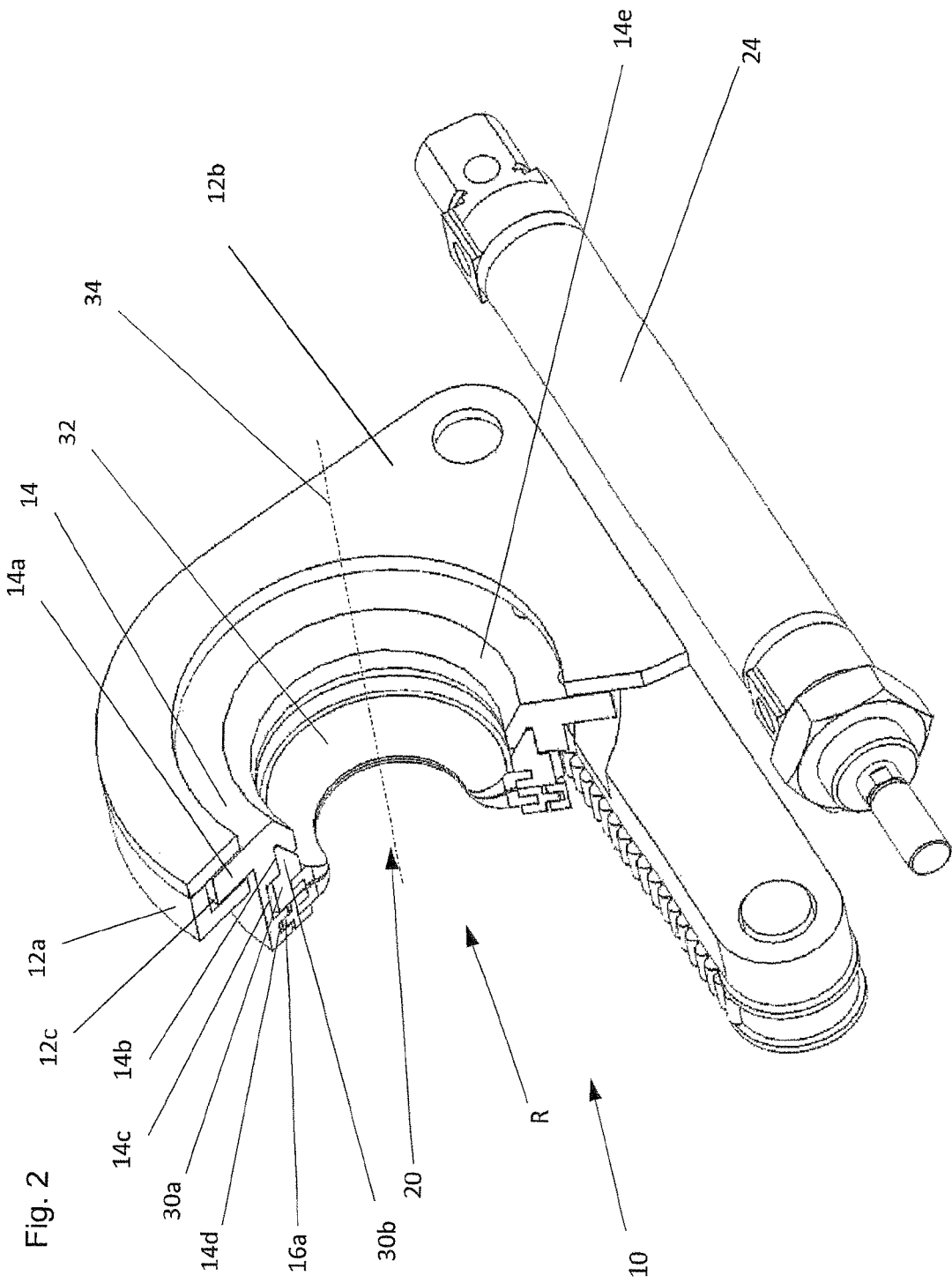
FIG. 2: is a schematic and perspective view of the first embodiment of the inventive casing brake assembly of FIG. 1 from a second perspective, wherein a second brake body is illustrated in the releasing position as well.

In FIG. 2, the first embodiment of casing brake assembly 10 is shown in releasing position R as well, but from a different perspective. Housing 14 has a circumferential housing nib 14a protruding in a radial direction with respect to common central axis 34. Housing nib 14a is arranged within a holder rim 12c of holder 12, formed by main holder body 12a and side plate 12b. Side plate 12b comprises a side bore 12d for a fixation means for reversibly fixing side plate 12b to main holder body 12a and thereby securing housing 14 to holder 12. The fixation means is not shown in the drawings and is preferably a screw or quick clamping means.

Figure 3:
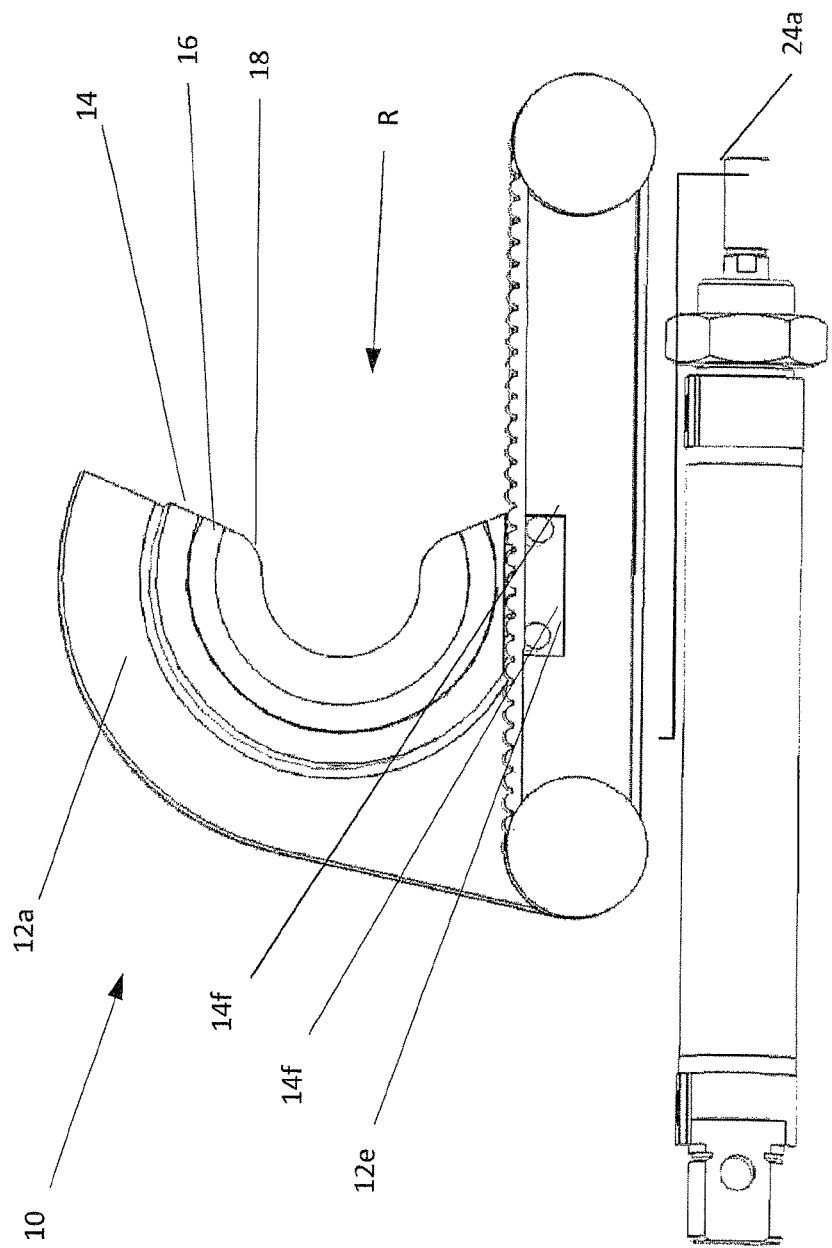
FIG. 3: is a schematic side view of the first embodiment of the casing brake assembly of FIG. 1 and FIG. 2, wherein the second brake body is illustrated in the releasing position as well.

As can be inferred from FIG. 2 and FIG. 3, housing 14 has two side pins 14f spaced apart and protruding parallel to common central axis in direction of first brake body 16. Each side pin 14f extends from housing 14 through a recess 12e of main holder body 12a. Hence, housing 14 is secured and float bedded with holder 12 and cannot be rotated around common central axis 34. Furthermore, side plate 12b is secured to main holder body 12a for being removable in a direction parallel to common central axis 34 only. The term "float bedded" in conjunction with housing 14 being secured in holder 12 has to be understood such that housing 14 is secured against removal from holder 12. But slight movement of housing 14 in radial and axial direction relative to central axis 34 in holder 12 is permitted, e.g. in order to enable centering movement of housing 14 on the filling tube.

Figure 4:
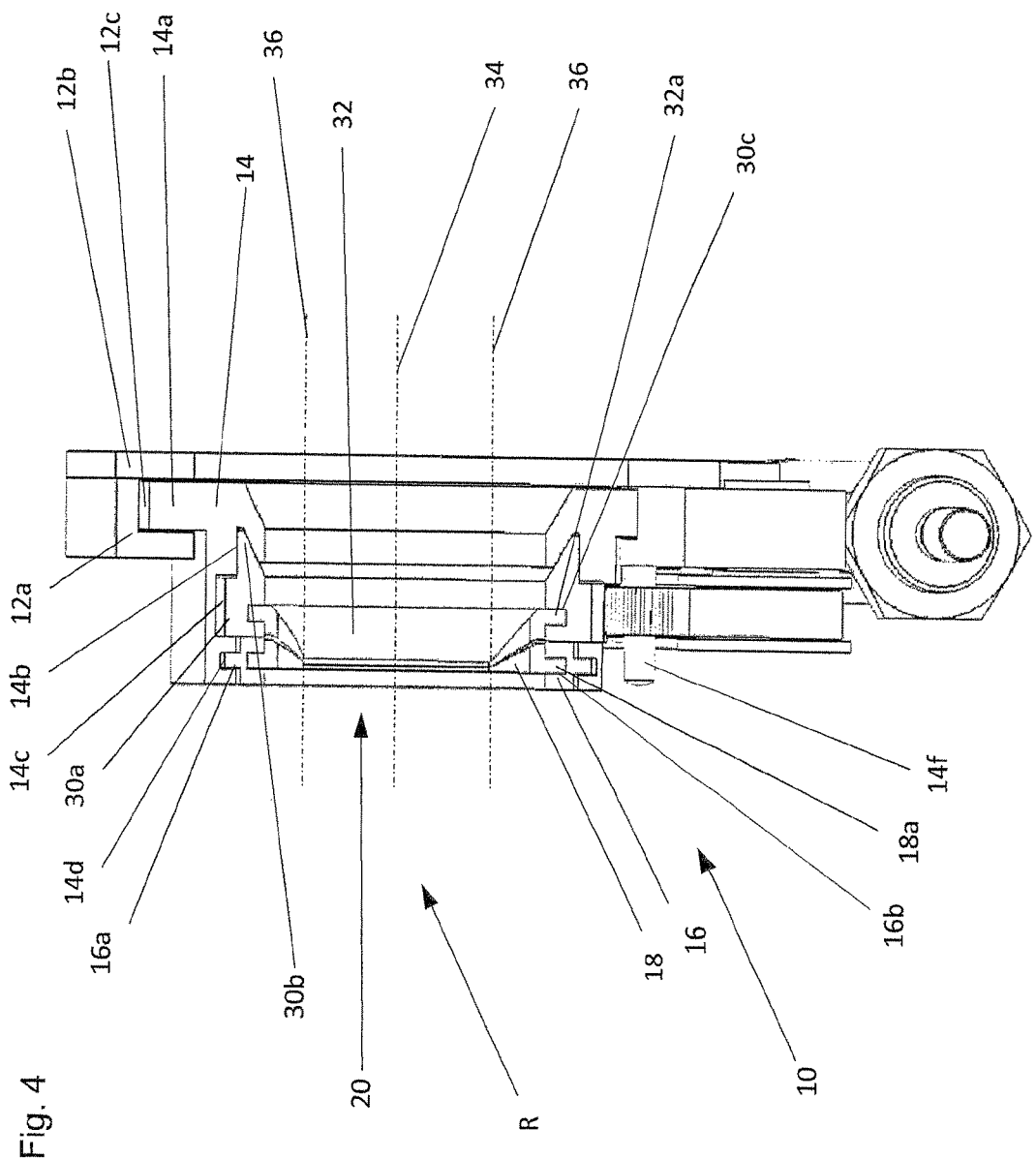
FIG. 4: is a schematic front view of the first embodiment of the casing brake assembly of FIG. 1 to FIG. 3, wherein the second brake body is illustrated in the releasing position as well.
Figure 5:
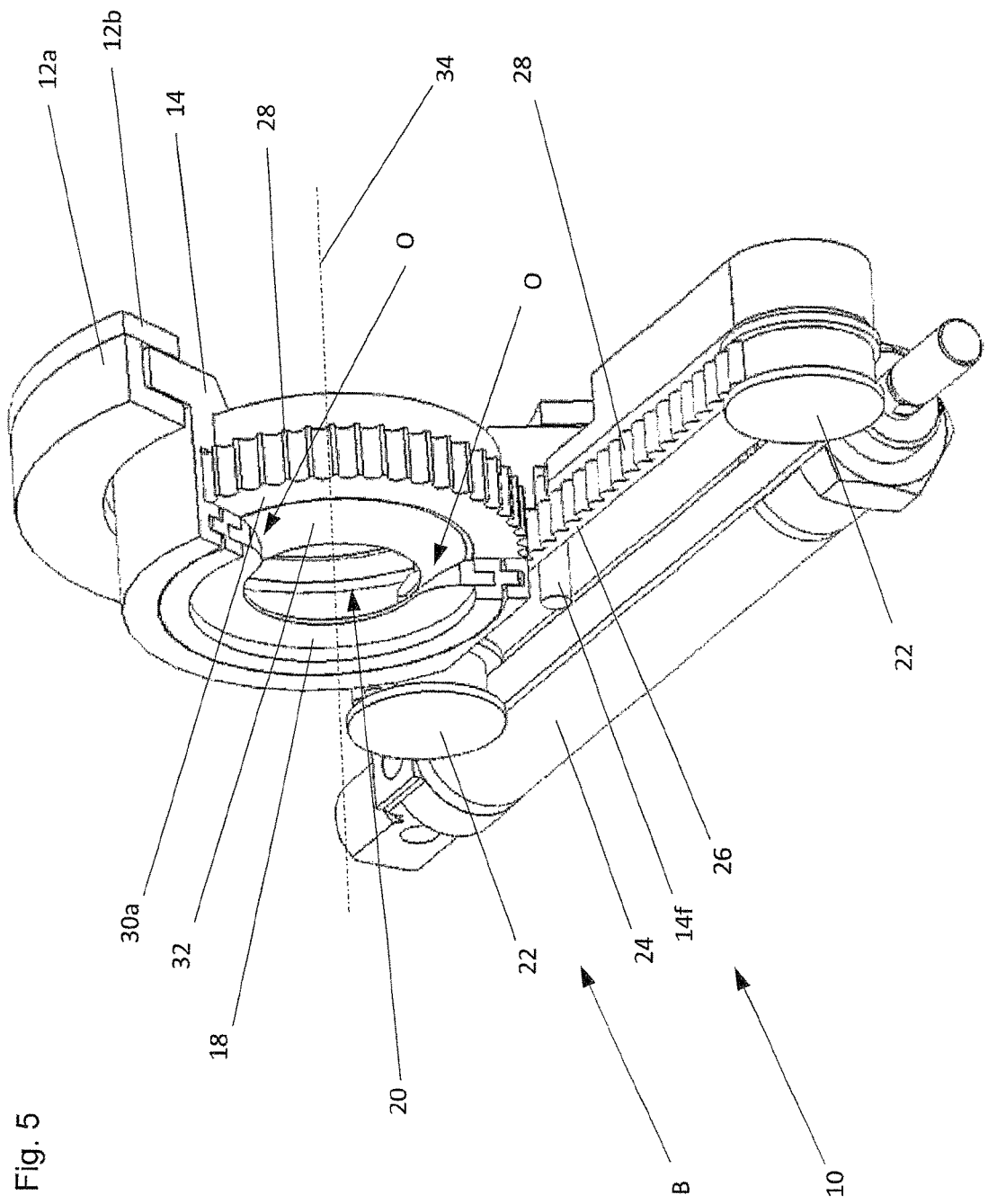
FIG. 5: is a schematic and perspective view of the first embodiment of the casing brake assembly of FIG. 1 to FIG. 4 from the first perspective, wherein the second brake body is illustrated in the braking position.
Figure 6:
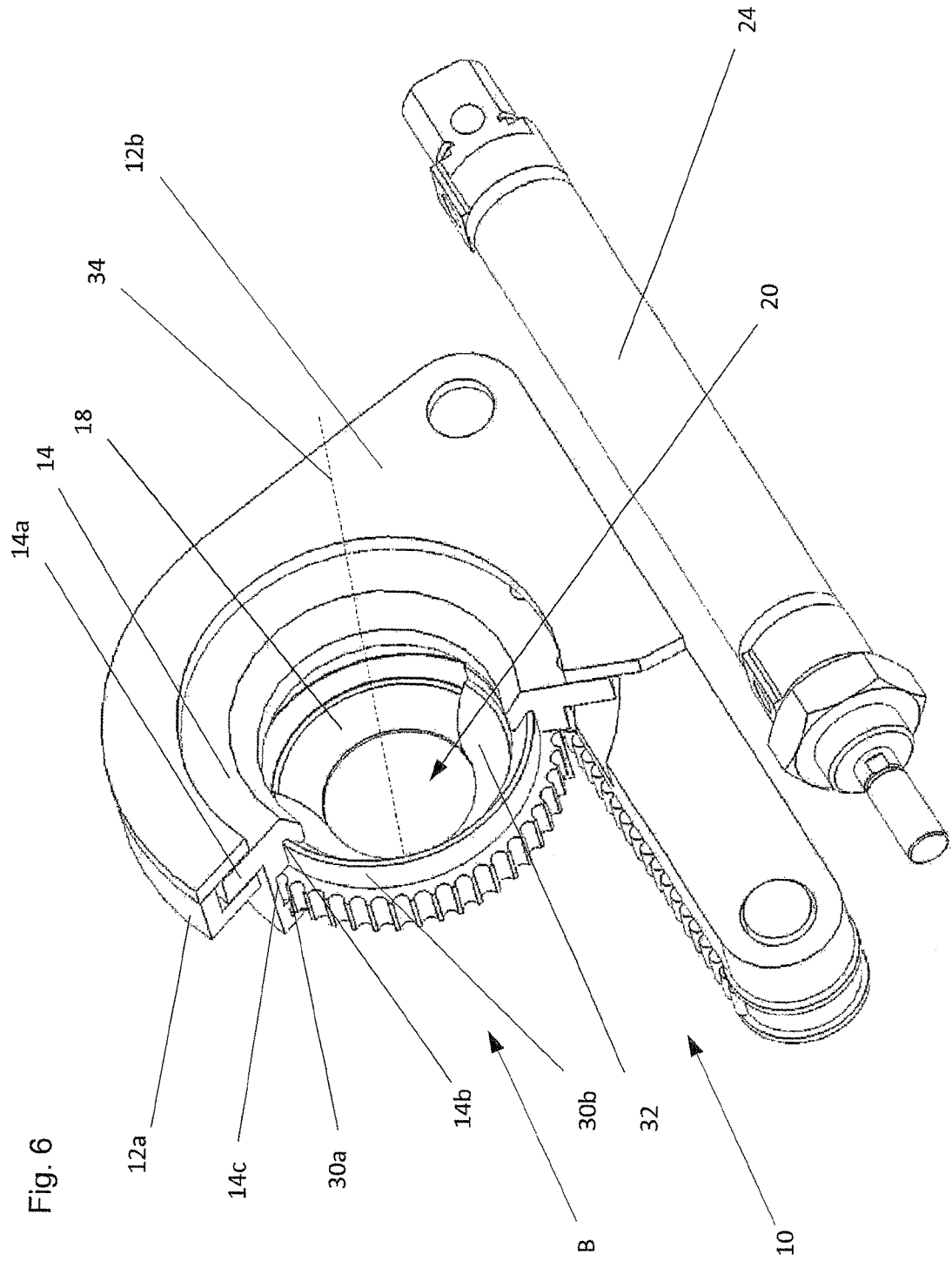
FIG. 6: is a schematic and perspective view of the first embodiment of the casing brake assembly of FIG. 1 to FIG. 5 from the second perspective, wherein the second brake body is illustrated in the braking position as well.

Referring to FIG. 2 and FIG. 4, housing 14 has a circumferential wedged clearance 14b and a circumferential second brake body rim 14c for holding second brake body 30 in axial direction with respect to common central axis 34 and allowing a rotational movement of second brake body 30 around common central axis 34. For this purpose, second brake body 30 has a circumferential second cogged portion 30a, which is protruding in a direction away from common central axis 34 and guided inside second brake body rim 14c. Furthermore, second brake body 30 has a circumferential wedged nib 30b, which is protruding in a direction parallel to common central axis 34 and towards side plate 12b. Wedged nib 30b is guided inside wedged clearance 14b of housing 14. Moreover, housing 14 has a circumferential first brake body rim 14d for hosting a circumferential brake body nib 16a of first brake body 16, which is protruding in a direction away from common central axis 34, and thereby reversibly fixing first brake body 16 to housing 14. Alternatively and for the same purpose, at least three spaced apart brake body nibs 16a can be provided at the same circumference. In addition, housing 14 can comprise respective fixation means, e.g. a fixation screw or pin, for securing first brake body 16 to housing 14.

Referring to FIG. 4, first brake lip 18 has a first lip nib 18a that is circumferentially protruding in a direction away from common central axis 34 into a first lip rim 16b of first brake body 16. By these means first brake lip 18 is reversibly fixed to fist brake body 16. Accordingly, second brake lip 32 comprises a second lip nib 32a circumferentially protruding in a direction facing away from common central axis 34 into a second lip rim 30c of second brake body and hence, reversibly fixing second brake lip 32 to second brake body 30. The outer filling tube margins 36 of a not shown filling tube are illustrated in FIG. 4 with dash-dotted lines.

FIG. 5 to FIG. 8 show the first embodiment of casing brake assembly 10 according to the invention in braking position B. In this position, second brake body 30 with second brake lip 32 is rotated around common central axis 34 by approximately 180° with respect to releasing position R. In the illustrated braking position B, first lip 18 and second brake lip 32 have two overlapping portions O, thereby forming a substantially closed ring with a circular inner clearance 20 for encompassing a not illustrated filling tube loaded with tubular packaging casing material and for applying frictional force onto the packaging casing at least during the filling process. In the illustrated embodiment, cog belt 26 has a cogged section comprising a plurality of cogs 28 and a substantially flat portion, wherein the cogged section should be long enough for being in engagement with cogs 28 of second cogged portion 30a of second brake body 30 between releasing position R and braking position B. Alternatively, cog belt 26 could be continuously cogged.

Figure 7:
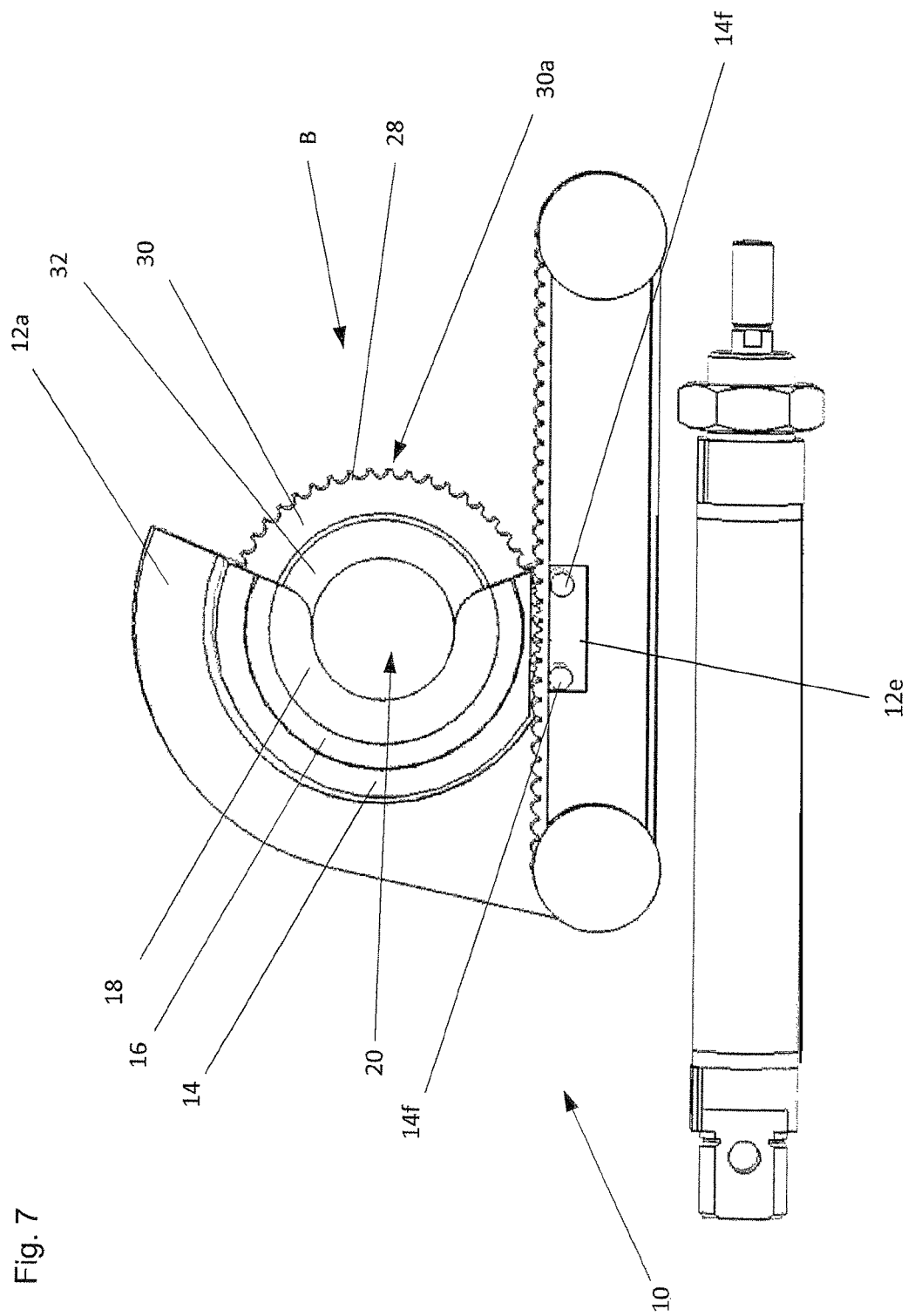
FIG. 7: is a schematic side view of the first embodiment of the casing brake assembly of FIG. 1 to FIG. 6, wherein the second brake body is illustrated in braking position as well.
Figure 8:
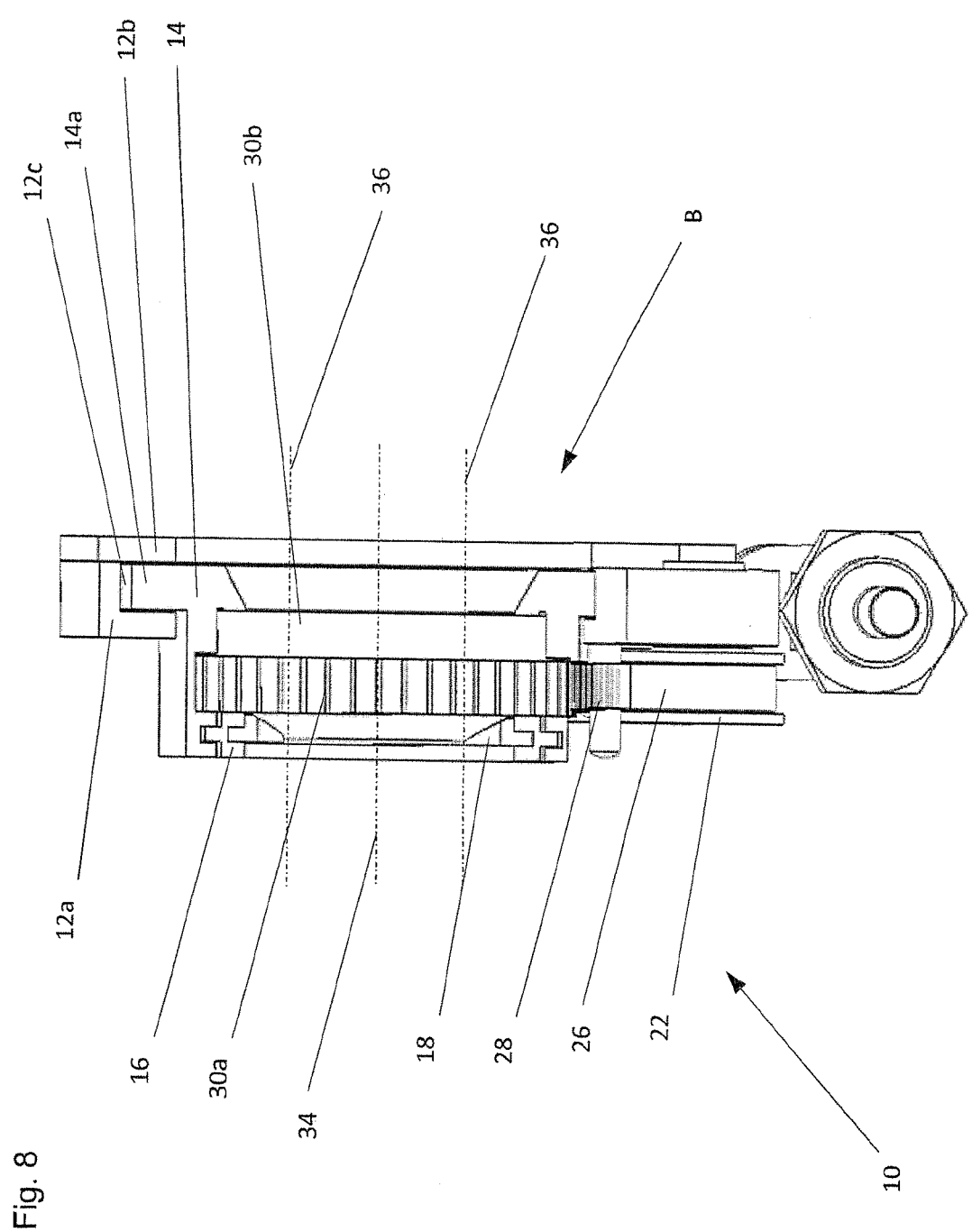
FIG. 8: is a schematic front view of the first embodiment of the casing brake assembly of FIG. 1 to FIG. 7, wherein the second brake body is illustrated in the braking position as well.
Figure 9:
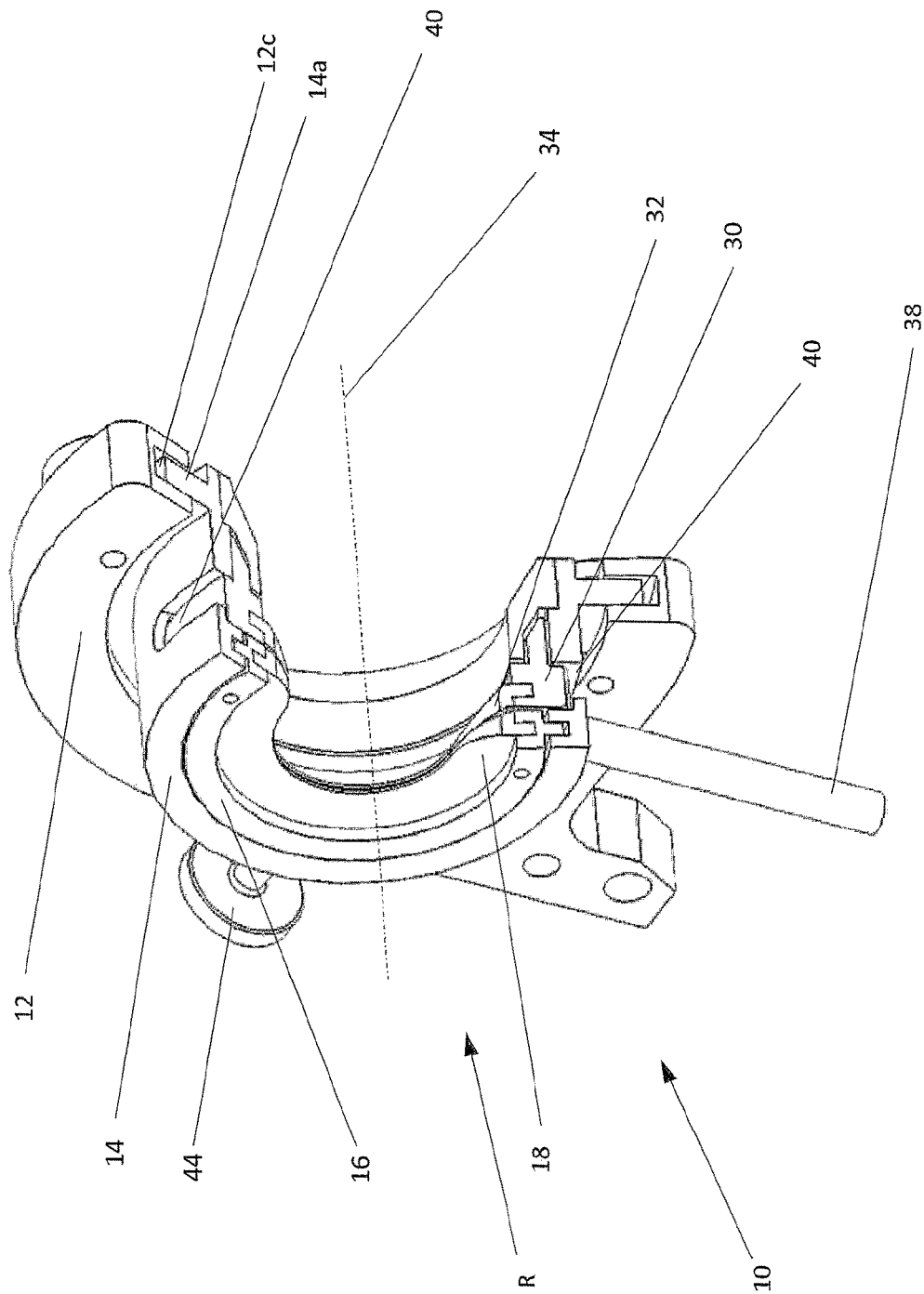
FIG. 9: is a schematic and perspective view of a second embodiment of the casing brake assembly according to the present invention from the first perspective, wherein the second brake body is illustrated in the releasing position.
Figure 10:
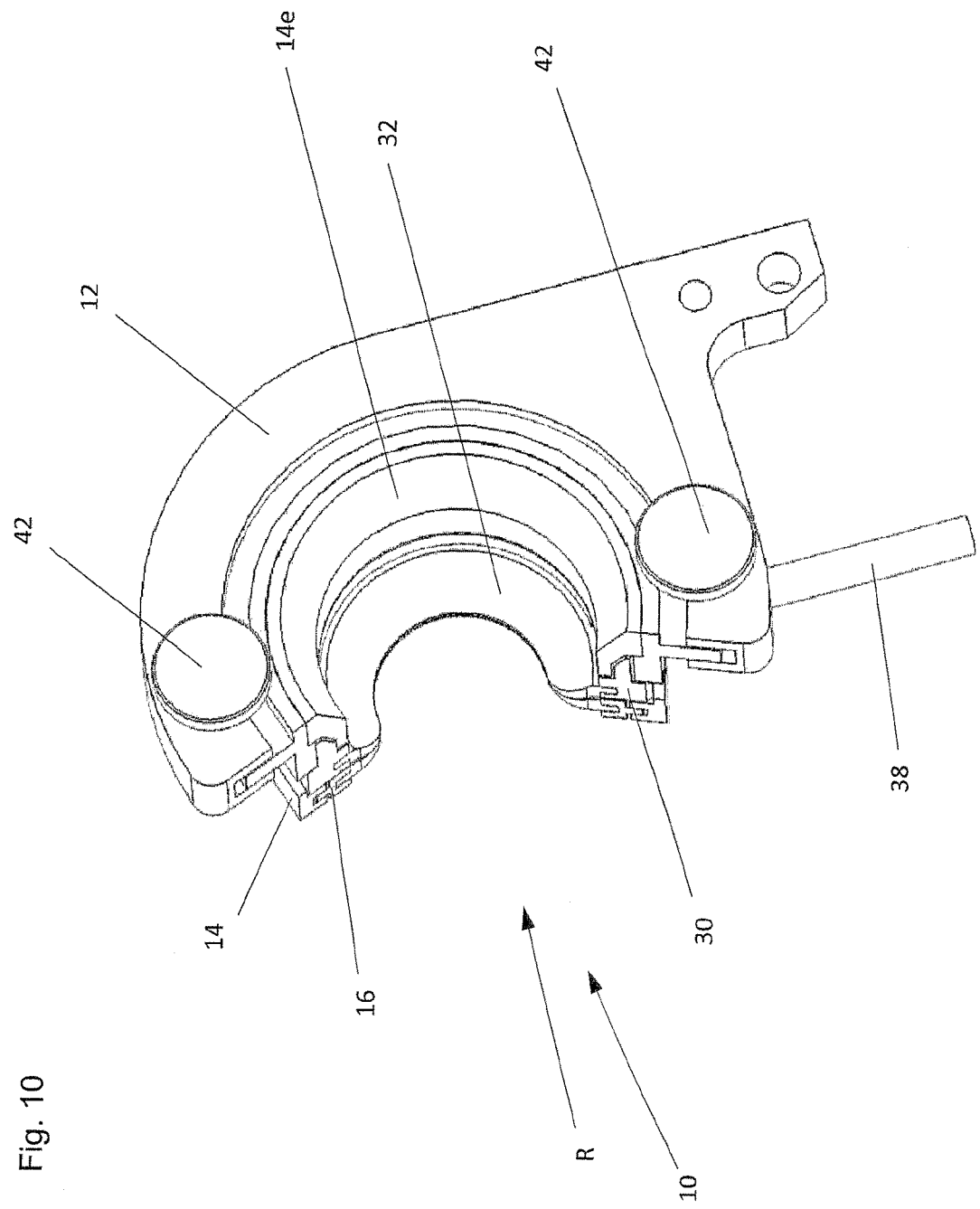
FIG. 10: is a schematic and perspective view of the second embodiment of the casing brake assembly of FIG. 9 from the second perspective, wherein the second brake body is illustrated in the releasing position as well.

As can be seen best in FIG. 3 and FIG. 7, a part of cog belt 36 is arranged between side pins 14f and second cogged portion 30a and is engaged with second cogged portion 30a. Thus, side pins 14f prevent cog belt 26 from disengaging from cogs 28 of second cogged portion 30a. Preferably, side pins 14f have a smooth surface and/or a sliding bushing or bearing for reducing friction with cog belt 36. Instead of a cog belt 26, second brake body 30 could be driven by a not illustrated cog wheel or cog rail.

For disassembling housing 14 with first brake body 16 and second brake body 30, a not illustrated fixation means has to be removed first. Subsequently, side plate 12b can be removed in a direction parallel to common central axis 34 and pointing away from first brake body 16. For this purpose, the operator can apply a pushing force e.g. against one of side pins 14f, housing 14 or first brake body 16 in the respective direction, thereby pushing a module comprising first brake body 16, second brake body 30, housing 14 and side plate 12b together away from main housing body 12a. Thereby, second brake body 30 can be pushed-off cog belt 26 laterally. When side pins 14f are not engaged with recess 12e anymore, the module can be removed from casing brake assembly 10 and be replaced by a new module comprising first brake body 16, second brake body 30, brake body adapter 14 and side plate 12b. The installation process is performed conversely to the removal process. In order to enhance to the installation process, one of side pins 14f is longer than the other for picking up and guiding cog belt 26 into position between side pins 14f and cogged portion 30a of second brake body 30. Such replacement procedure is for example necessary when first brake lip 18 and/or second brake lip 32 are worn out or if a shift of production requires a filling tube of different size and therefore a matching inner clearance as to be provided. Alternatively, side plate 12b can be removed first and housing 14 is removed together with first brake body 16 and second brake body 30 afterwards.

FIG. 9 to FIG. 12 show a second embodiment of casing brake assembly 10 according to the present invention. Housing 14 and first brake body 16 are basically similar to the respective parts of the first embodiment. Holder 12 according to the second embodiment does not include a side plate. Holder rim 12c is dimensioned to enable housing 14 to be removed in radial direction from holder 12. Housing 14 comprises two handle recesses 40 for receiving a handle 38. Handle 38 has a circular cross-section and protrudes from the outer surface of second brake body 30 facing away from common central axis 34 in radial direction facing away from common central axis 34. The handle recesses 40 are arranged and shaped for providing an end stop to handle 38 in releasing position R and in braking position B.

Figure 11:
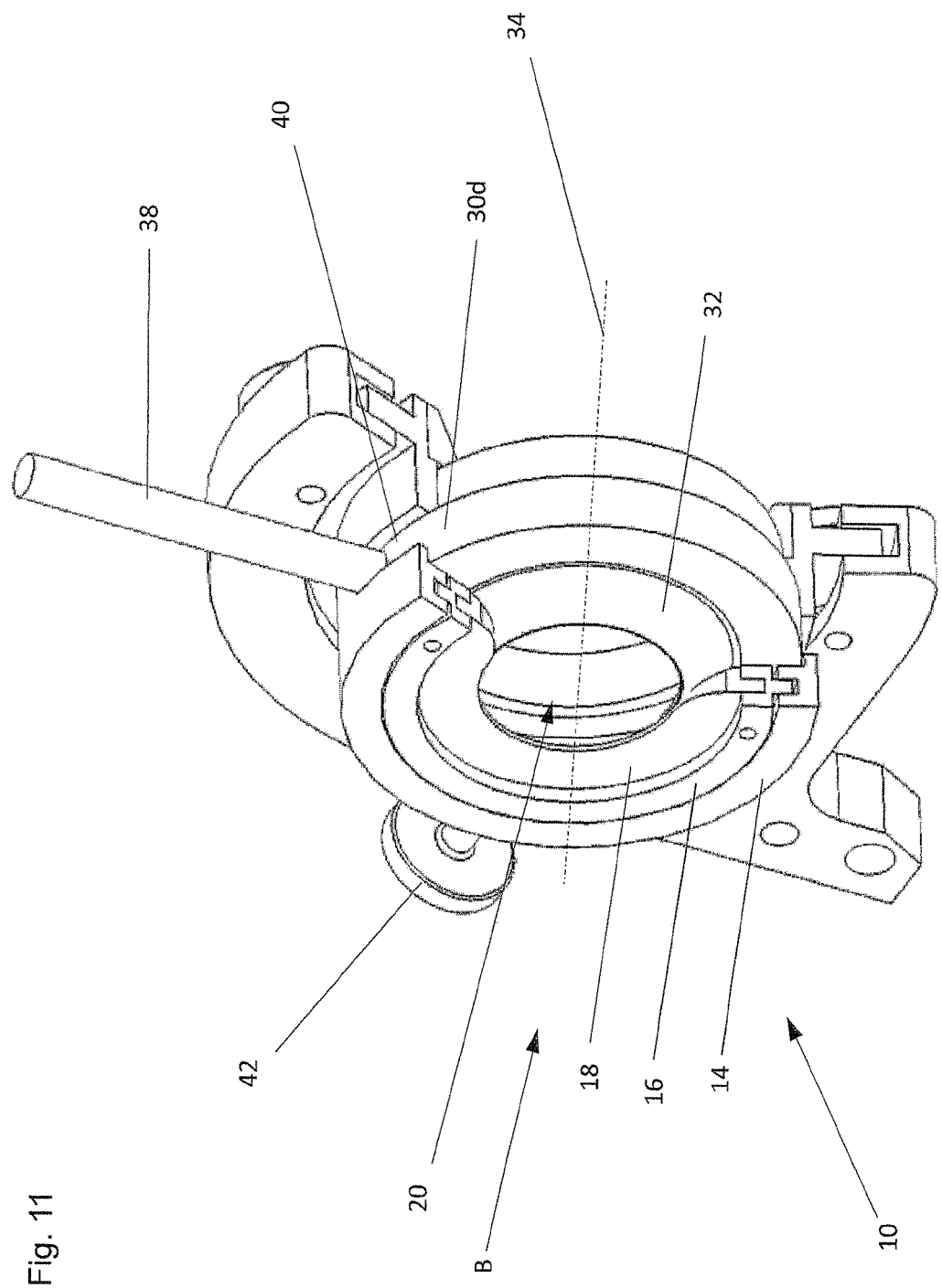
FIG. 11: is a schematic and perspective view of the second embodiment of the casing brake assembly of FIG. 9 and FIG. 10 from the first perspective, wherein the second brake body is illustrated in the braking position.
Figure 12:
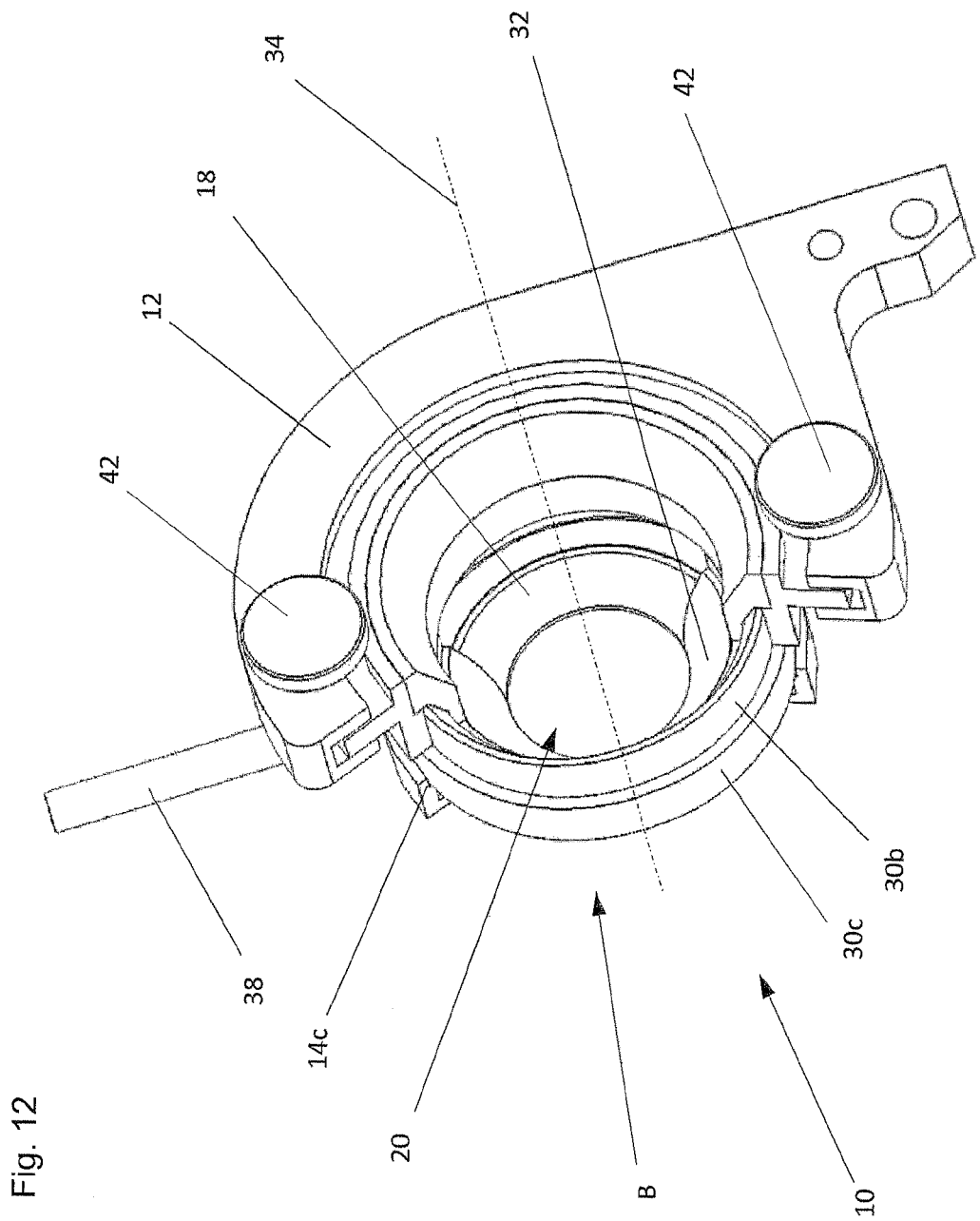
FIG. 12: is a schematic and perspective view of the second embodiment of the casing brake assembly of FIG. 9 to FIG. 11 from the second perspective, wherein the second brake body is illustrated in the braking position as well.

As can be seen best in FIG. 11 and FIG. 12, second brake body 30 comprises a ring portion 30d circumferentially protruding in radial direction, facing away from common central axis 34. Ring portion 30d is guided in second brake body rim 14c of housing 14. For moving second brake body 30 from releasing position R to braking position B, handle 38 has to be moved from one handle recess 40 to the other handle recess 40, thereby first brake lip 18 and second brake lip 32 are forming a substantially closed ring with a circular inner clearance 20, wherein first brake lip 18 and second brake lip 32 are arranged similar to the arrangement of the first embodiment of the invention and having two overlapping portions O. For moving second brake body 30 to releasing position R, the whole procedure has to be performed reversed. For fixing second brake body 30 in a certain position, preferably braking position B and releasing position R, fixing means, like a screw or a clamp, may be provided (not shown). Alternatively, second brake body 30 may be secured in the respective position only by the friction resulting from the force by which second brake body 30, and in particular second brake lip 32, acts against first brake lip 18 of first brake body 16.

Furthermore, an adjustment screw 44 is provided at the outer surface of housing 14 protruding away from common central axis 34. Adjustment screw 44 may be reversibly screwed into housing 14, whereby screw 44 acts on the outer surface of first brake body 16, which is thereby radially reversibly shifted towards central axis 34. By these means, the position of first brake body 16 relatively to housing 14 can be adjusted along an adjustment direction. In the illustrated embodiment, the adjustment direction is perpendicular to common central axis 34. When shifting first brake body 16 towards central axis 34, also the position of the filling tube is altered, i.e. slightly in the adjustment direction, but away from central axis 34. Thereby, the filling tube is pushed against second brake body 30 when in the brake position, resulting in a braking force which is approximately equal around the filling tube.

Holder 12 according to the second embodiment of casing brake assembly 10, shown in FIGS. 9 to 12, has a holder rim 12c is dimensioned to enable housing 14 to be removed in radial direction from holder 12. In order to secure housing 14 in holder rim 12c, fixation screws 42 are provided, and having a screw shaft which extends through the whole width of holder 12. Fixation screws 42, if mounted to holder 12, reduce the clearance of holder rim 12c to a value that is smaller than the outer dimension of housing nib 14a, in order to prevent housing 14 from being removed from holder 12. Naturally, housing 14 is not fixedly secured in holder 12 by fixation screws 42, but float bedded, as explained in conjunction with the first embodiment of casing brake assembly 10.

Figure 13:
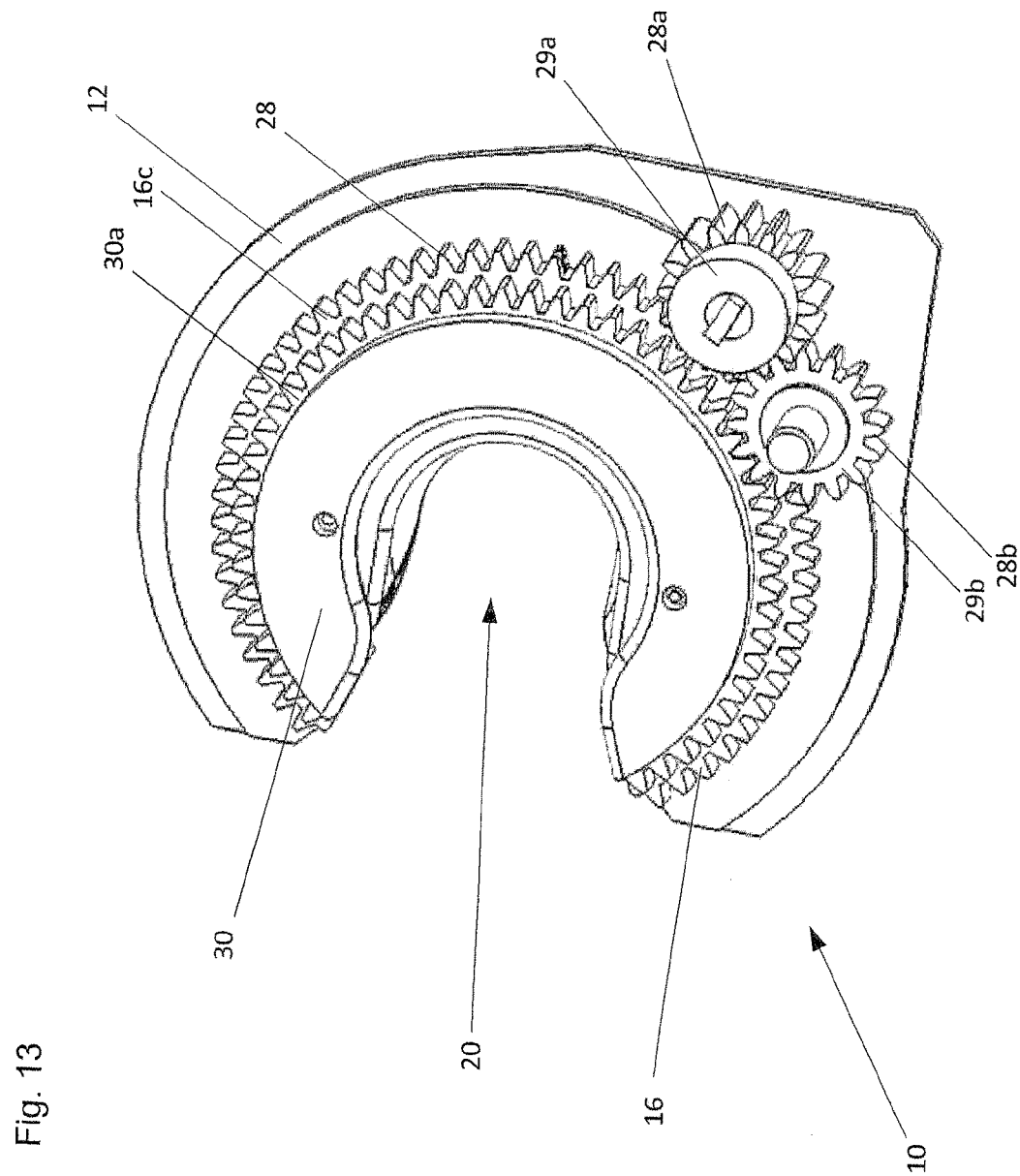
FIG. 13: is a schematic and perspective view of a third embodiment of the casing brake assembly according to the present invention, wherein the first brake body and the second brake body are illustrated in releasing position.
Figure 14:
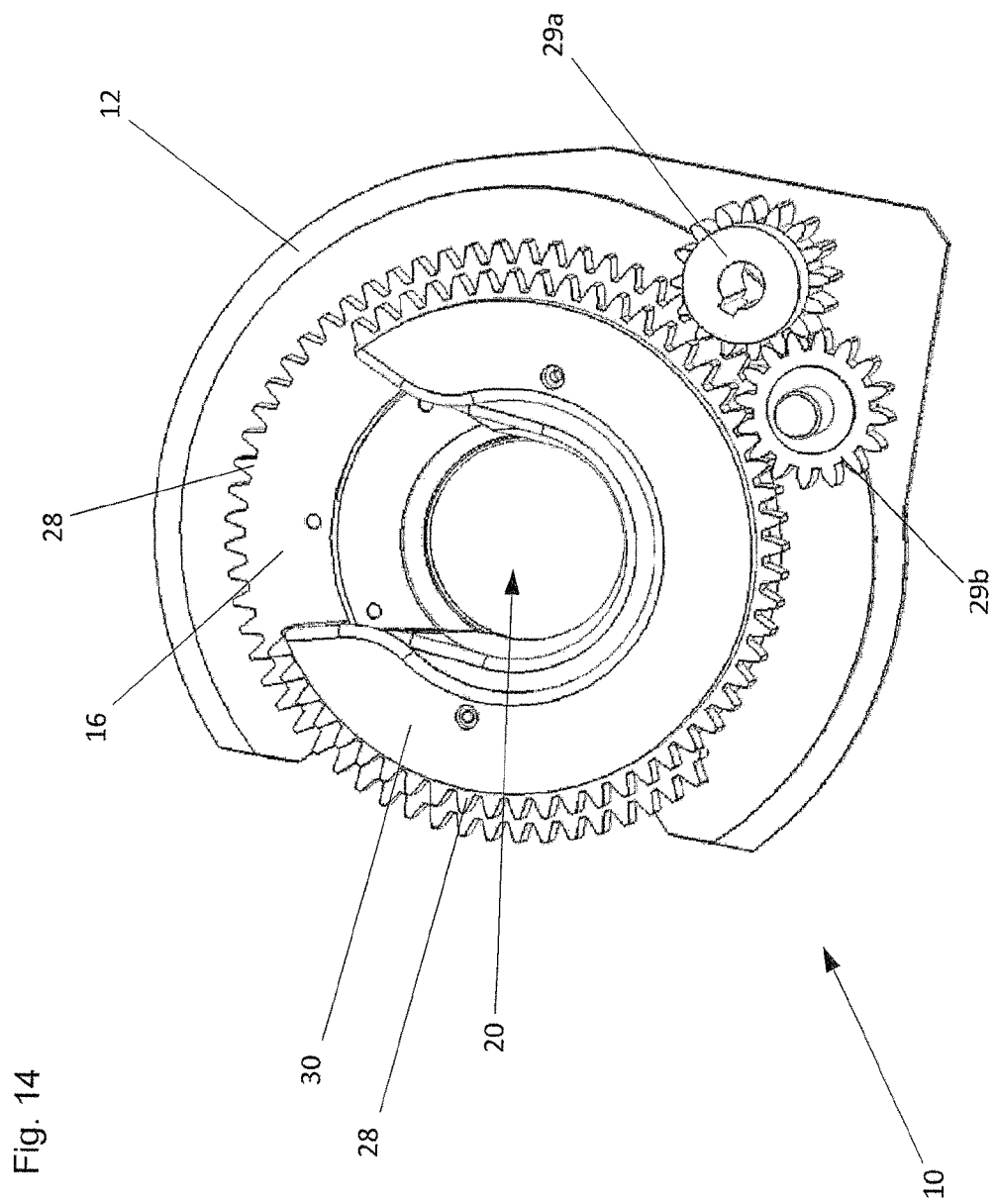
FIG. 14: is a schematic and perspective view of the third embodiment of the casing brake assembly according to FIG. 13, wherein the first brake body and the second brake body are illustrated in braking position.

FIG. 13 and FIG. 14 show a third embodiment of the casing brake assembly 10 according to the present invention. Casing brake assembly 10 of the third embodiment comprises a housing 14 which has a main housing portion and a housing side plate 14g. The main housing portion, which covers the inner parts of casing brake assembly 10, like first brake body 16, second brake body 30 or drive elements which will be explained in detail below, is not shown in FIGS. 13 and 14.

In the third embodiment, first brake body 16 and second brake body 30, both are rotatable arranged about common central axis 34 between releasing position R as shown in FIG. 13 and braking position B as shown in FIG. 14, but in opposite direction. First brake body 16 comprises a first cogged portion 16c and second brake body 30 comprises second cogged portion 30a, wherein first cogged portion 16c and second cogged portion 30a are facing away from common central axis 34. A first cog wheel 29a is engaged with first cogged portion 16c and a second cog wheel 29b, wherein second cog wheel 29b is engaged with second cogged portion 30a. In this embodiment, cogs 28a of first cog wheel 29a are wider than cogs 28b of second cog wheel 29b and cogs 28 of first cogged portion 16c are protruding further away from common central axis 34 than cogs 28 of second cogged portion 30a. First cog wheel 29a is driven by not illustrated drive means, causing first brake body 16 and second brake body 30 rotating counter clockwise around common central axis 34 between braking position B and releasing position R. Since second cog wheel 29b is engaged with first cog wheel 29a, second cog wheel 29b does not need extra drive means. In an alternative, not illustrated embodiment, cogs 28 of second cogged portion 30a could protrude further away from common central axis 34 than cogs 28 of first cogged portion 16c. In that case, second brake body 30 would be engaged with first cog wheel 29a and first brake body 16 would be engaged with second cog wheel 29b.

As explained above, first brake body 16 and second brake body 30, according to the first to third embodiment of casing brake assembly 10, have the shape of a 200°-segment of a hollow cylinder. It has to be understood that an angle of 180° as a minimum angle is sufficient to enable a secure enclosing the filling tube. Also an angle larger than 200°, i.e. 220° may be possible. Same is true with regard to the segment angle of housing 14. But, it has to be ensured that the clearance in the respective segment has a width to enable the filling tube to be pivoted into and out of the casing brake assembly.

Also, first and second brake lip 16a, 30a may encompass an angel of at least 180°, but preferably larger than 180° to surely form a closed ring around the filling tube. It has to be ensured that the filling tube may pass the clearance or open segment of said brake lips when in the release position, e.g. by partially bending flexible portions of the brake lips.

For preventing housing 14 from rotating in holder 12, side pins 14f are provided, which engage recess 12e in holder 12. Naturally other engagement means may be provided like rectangular pins or a single cuboid which matches with recess 12 but enables a slight movement of housing 14 in holder 12 in order to realize the float bedding of housing 14 as explained above.

The invention claimed is:

1. A casing brake assembly for applying a frictional force to a tubular or bag-shaped packaging casing being arranged on a filling tube of an apparatus used for filling and closing said tubular or bag-shaped packaging casing, like a clipping machine, and for limiting the movement of said tubular or bag-shaped packaging casing at least while being filled, wherein the filling tube has a circular cross-section and a longitudinal filling tube axis, the casing brake assembly comprising:
a housing, and
comprising at least a first brake body and at least a second brake body, wherein the first brake body has a first inner clearance shaped like a segment of a circle with a first central axis, and second brake body has a second inner clearance shaped like a segment of a circle with a second central axis, wherein the first inner clearance and the second inner clearance are arranged coaxially on a common central axis extending though said housing, wherein at least the second brake body is reversibly movable relative to the first brake body between a releasing position and a braking position along an at least substantially circular-shaped moving path about said common central axis, wherein, in releasing position, said brake bodies substantially overlap each other, thereby forming a ring, which has an open segment, wherein the open segment of the ring is shaped such that the filling tube is movable through the open segment of the ring, and wherein, in braking position, said brake bodies form a substantially closed ring.

2. The casing brake assembly according to claim 1, wherein the first inner clearance and the second inner clearance are at least approximately semicircular-shaped.

3. The casing brake assembly according to claim 1, wherein the at least first brake body and the at least second brake body are reversibly movable relative to each other between a releasing position and a braking position along an at least substantially circular-shaped moving path about said common central axis.

4. The casing brake assembly according to claim 1, wherein a third brake body with a third inner clearance shaped like a segment of a circle with a third central axis is provided, wherein the third central axis is basically arranged coaxially with said common central axis, and wherein the third brake body is reversibly movable relative to first brake body between a releasing position and a braking position along the at least substantially circular-shaped moving path about said common central axis.

5. The casing brake assembly according to claim 4, wherein a drive unit is provided for reversibly driving at least one of the first, second or third brake body on the circular moving path about the central axis between the releasing position and the braking position.

6. The casing brake assembly according to claim 5, wherein the drive unit includes a cog belt or cogged wheels, which engage with respectively cogged portions of the at least one of the first, second or third brake body, controlled by a control unit.

7. The casing brake assembly according to claim 6, wherein the at least first brake body has a first cogged portion and the at least second brake body has a second cogged portion, and wherein the drive unit includes a first cog wheel and a second cogged wheel for reversibly driving the first brake body and the second brake body between a releasing position and a braking position along an at least substantially circular-shaped moving path about said common central axis in opposite direction.

8. The casing brake assembly according to claim 5, wherein the at least first brake body has a first cogged portion and the at least second brake body has a second cogged portion, and wherein the drive unit includes a first cog wheel and a second cogged wheel for reversibly driving the first brake body and the second brake body between a releasing position and a braking position along an at least substantially circular-shaped moving path about said common central axis in opposite direction.

9. The casing brake assembly according to claim 5, wherein the drive unit comprises a handle for being manually driven by an operator.

10. The casing brake assembly according to claim 5, wherein an adjusting screw is provided at the outer surface of the housing for moving the first brake body relative to the second brake body to adjust the frictional force applied by the brake bodies to the casing material on the filling tube.

11. The casing brake assembly according to claim 1, wherein the first brake body and the second brake body comprise braking and sealing elements facing towards common central axis.

12. The casing brake assembly according to claim 11, wherein, in the braking position, the braking and sealing elements partially overlap each other with respect to the direction of the circular-shaped moving path.

13. The casing brake assembly according to claim 11, wherein the casing brake and sealing elements abut against each other with a predefined force.

14. The casing brake assembly according to claim 11, wherein the braking and sealing elements are formed by string-shaped resilient brake lips.

15. The casing brake assembly according to claim 11, wherein the braking and sealing elements are formed by a plurality of string-shaped resilient elements.

16. The casing brake assembly according to claim 15, wherein the at least first brake body and the at least second brake body are mutually arranged in a way that the first brake body protrudes the second brake body at least in one direction with respect to the common central axis.

17. The casing brake assembly according to claim 1, wherein the at least first brake body and the at least second brake body are mutually arranged in a way that the first brake body protrudes the second brake body at least in one direction with respect to the common central axis.

\* \* \* \* \*